US006484620B2

(12) United States Patent
Arshad et al.

(10) Patent No.: US 6,484,620 B2
(45) Date of Patent: Nov. 26, 2002

(54) LASER BASED REFLECTIVE BEAM CYLINDER SENSOR

(75) Inventors: Mohammad J. Arshad, Naperville; Alan D. Berger, Winfield; Danley C. K. Chan, Chicago, all of IL (US)

(73) Assignee: Case Corporation, Racine, WA (US)

( * ) Notice: Subject to any disclaimer, the term of this patent is extended or adjusted under 35 U.S.C. 154(b) by 0 days.

(21) Appl. No.: 09/750,866

(22) Filed: Dec. 28, 2000

(65) Prior Publication Data

US 2002/0083826 A1 Jul. 4, 2002

(51) Int. Cl.$^7$ .................................................. F01B 31/12
(52) U.S. Cl. .............................................. 92/5 R; 91/1
(58) Field of Search ................... 92/5 R; 91/1

(56) References Cited

U.S. PATENT DOCUMENTS 6,142,059 A * 11/2000 Chan et al. .................... 92/5 R
6,267,042 B1 * 7/2001 Nagai .......................... 92/5 R

* cited by examiner

*Primary Examiner*—Edward K. Look
*Assistant Examiner*—Michael Leslie
(74) *Attorney, Agent, or Firm*—A. N. Trausch

(57) ABSTRACT

A hydraulic actuator is disclosed having a cylinder with a piston that is moved by hydraulic fluid. A light guide in one end of the cylinder directs a laser beam into the cylinder, and off the piston where the beam is reflected. The beam then exits the cylinder through a second light guide. A control unit measures the time of flight of the laser beam and calculates the piston position.

21 Claims, 2 Drawing Sheets

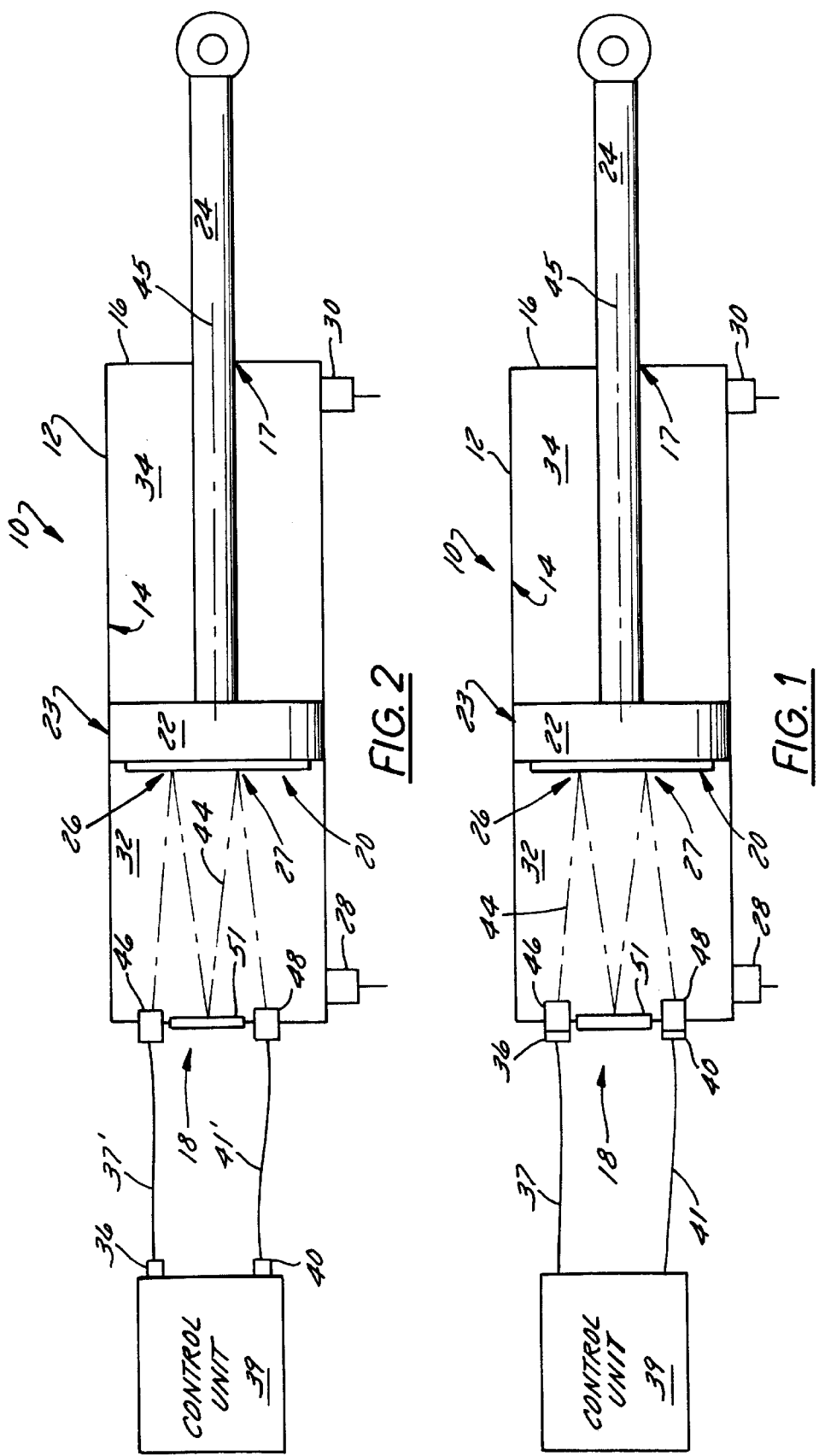

US 6,484,620 B2

LASER BASED REFLECTIVE BEAM CYLINDER SENSOR

FIELD OF THE INVENTION

The invention relates to measuring the excursion of hydraulic actuators using laser time-of-flight techniques. More particularly, it relates to linear hydraulic cylinders having laser light pulse emitters and laser light detectors reflecting off moving internal surfaces of the hydraulic cylinder.

BACKGROUND OF THE INVENTION

With the increased computerization of traditionally mechanical and hydro-mechanical systems, the ability to accurately control and position a wide variety of agricultural and construction equipment has become possible. Using proportional control valves and hydraulic server motors, agricultural and construction vehicles have been designed that can compensate for a wide variety of environmental variables to much more accurately control the motion and positioning of their various arms and linkages.

To provide the ever-more-accurate positioning and control that microprocessors are capable of, one must know ever more accurately the exact position of the various linkages, arms and actuators that comprise these vehicles. Other methods of determining the location of mechanical components of these vehicles included such things as rotary potentiometers and resistors mounted at pivoting joints, linear variable differential transformers coupled to the outside of extendable devices such as hydraulic cylinders that extend and retract, and linear variable resistors.

These older methods of determining the location of various components of the vehicles are now seriously outmoded. In particular, many of these components include several moving parts that are exposed to the elements, and therefore are prone to be broken, bent or otherwise become un-calibrated.

What it need, therefore, is a more robust system of determining the position of vehicle components that reduces the risk of breakage, mis-calibration, and provides a greater positional accuracy than these previous devices. It is an objective of the present invention to provide such a system.

SUMMARY OF THE INVENTION

In accordance with a first embodiment of the invention, a fluid actuated cylindrical actuator is provided that includes a cylinder having first and second ends, an end cap fixed to the first end of the cylinder and having a rod opening, a piston disposed in the cylinder, a rod coupled to the piston and extending from inside the cylinder to outside the cylinder and passing through the rod opening, a first light guide extending from inside the cylinder to outside the cylinder and adapted to transmit at least a first beam of laser light at a first frequency from outside the cylinder to inside the cylinder and to bar the passage of the fluid, and second light guide extending from inside the cylinder to outside the cylinder and adapted to transmit the at least a first beam of laser light at the first frequency from inside the cylinder to outside the cylinder and to bar the passage of fluid. The first light guide may be disposed to transmit the first beam of laser light substantially along a longitudinal axis of the cylinder such that the first beam impinges on a reflective portion of the piston over substantially an entire range of piston travel. The second light guide may be disposed to receive the first beam after it has been reflected off the piston. The optical distance between the first light guide and the second light guide may be a function of the degree of extension of the rod outside the cylinder. The first beam of light may be reflected off a first surface inside the cylinder where the first surface is coupled to the rod and configured to move with the rod. The first beam of light may be reflected off a second surface fixed with respect to the cylinder and movable with respect to the rod and a third surface fixed with respect to the rod and movable with respect to the cylinder. The first beam may vary in optical length when the rod is moved with respect to the cylinder an amount equal to at least four times an axial distance the rod travels.

In accordance with a second embodiment of the invention, a hydraulic actuator for an agricultural or construction vehicle is provided, the actuator including a cylinder having a substantially circular internal diameter and a longitudinal cylindrical axis, a piston having a substantially circular outer diameter and configured to be received in and hydraulically sealed against the inner diameter of the cylinder, a piston rod with a substantially circular outer rod diameter that is fixed to the piston and extends from the piston inside the cylinder, through a first end wall of the cylinder to a location outside the cylinder, wherein the first end wall is disposed to enclose and seal a first end of the cylinder and is substantially perpendicular to the longitudinal axis of the cylinder, a second end wall fixed to the cylinder and disposed to seal a second end of the cylinder substantially perpendicular to the longitudinal axis of the cylinder, the second end wall including a first optical path configured to transmit a beam of laser light through the second end wall to a reflective surface fixed to the piston and further including a second optical path configured to transmit the reflective beam of laser light back through the end wall, a first optical fiber optically and mechanically coupled to the second end wall to transmit the beam of laser light from a remote laser light source to the first optical path and a second optical fiber optically and mechanically coupled to the second end wall to transmit the reflected beam of laser light to a remote laser light receiver.

The first and second optical paths may include at least one hermetically sealed fiber optical feed-through or connector extending through the second end wall. At least one fiber optic feed-through or connector includes an adjustable focal length lens disposed in the beam of laser light and configured to adjust a focal length of the beam of laser light within the cylinder. At least one fiber optic feed-through or connector may include a threaded end cap with the adjustable focal length lens fixed to the end cap. The hydraulic actuator may include another hermetically sealed fiber optic feed-through or connector extending through the second end wall. The first and second optical fibers may be multi-modal optical fibers. The actuator may also include a first laser diode configured to emit a beam of laser light at a wavelength in the range of 840 to 980 nanometers. The hydraulic actuator may also include a first photo-diode configured to receive the beam of reflective laser light and generate an electrical signal indicative of at least one characteristic of the beam. The actuator may also include a second laser diode configured to emit the beam of laser light in the range of 430 to 1300 nanometers. The actuator may include a second photo diode configured to receive a beam of laser light and generate an electrical signal indicative of at least one characteristic of the beam.

In accordance with a third embodiment of the invention, a method of determining the position of the piston of the actuator described in the previous paragraph includes the steps of generating the beam of laser light, reflecting the beam of laser light off a surface fixed to move axially with the piston, receiving the reflected beam of laser light, and calculating a time-of-flight. The step of generating the beam may include the step of generating the beam with a wavelength of between 430 and 1300 nanometers. The step of generating the beam may include the step of generating the beam with a wavelength in the range of 840 and 980 nanometers. The step of generating the beam may include the step of generating a sequence of individual pulses of light, and the step of calculating a time-of-flight may include the step of determining the time-of-flight of at least one pulse in the sequence of individual pulses of light.

BRIEF DESCRIPTION OF THE DRAWINGS

FIG. 1 is a partial cross-sectional view of a hydraulic actuator having the laser-based reflective beam sensor and a control unit for generating the laser beam and calculating the position of the actuator wherein the laser light sources are located remotely from the actuator and cables including two fiber optic light guides couple the control unit to the actuator;

FIG. 2 illustrates an alternative embodiment of a hydraulic actuator of FIG. 1 in which the laser light sources are located at the actuator and cables including two electrical conductors couple the control unit to the actuator.

DETAILED DESCRIPTION OF THE PREFERRED EMBODIMENT

Figure 3:
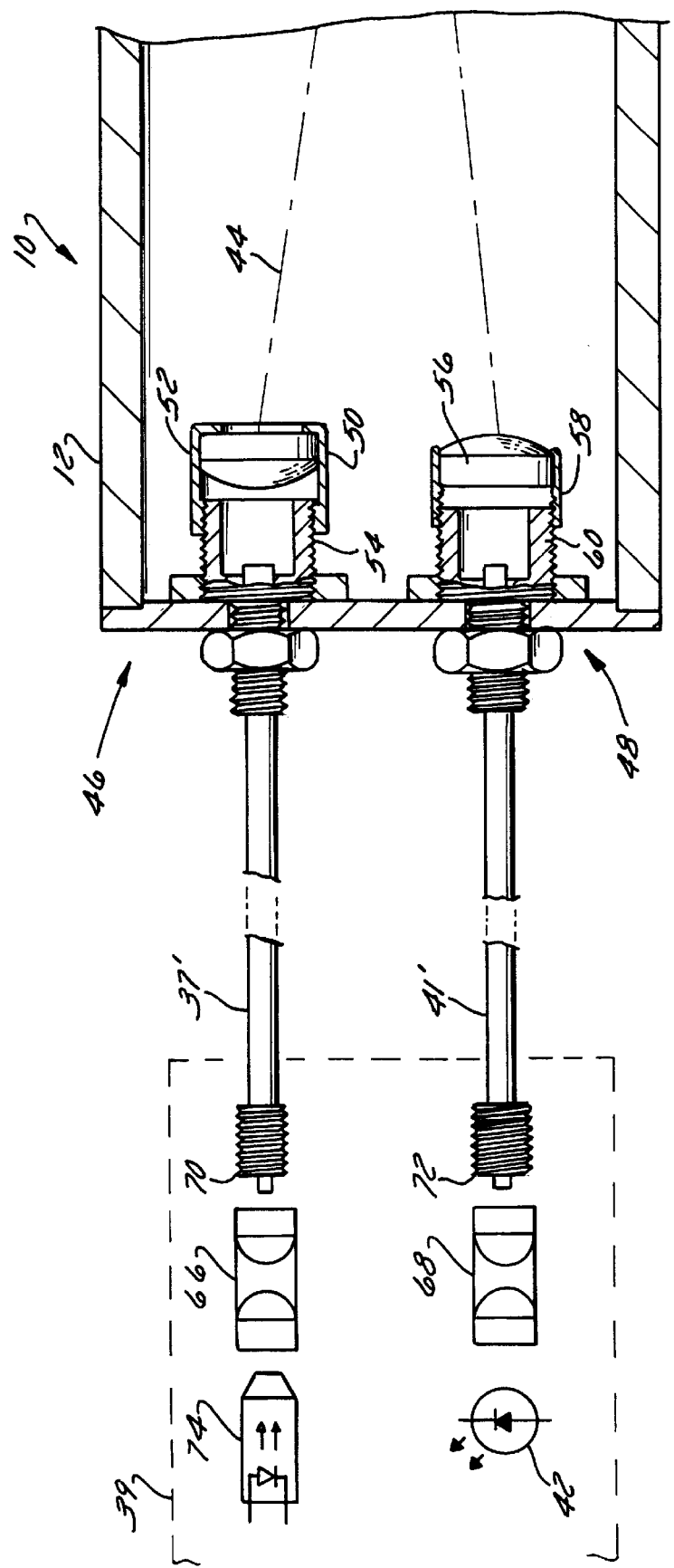
FIG. 3 is a detailed view of the embodiment of FIG. 2 showing the feed-throughs or connectors 46 and 48 in more detail, as well as the fiber optic cables and the connections at control unit 39.

FIG. 1 is a schematic view of a linear cylindrical actuator 10 in accordance with the present invention. Actuator 10 includes a cylinder 12 having an inner diameter 14 and two end caps 16, 18. Rod end cap 16 encloses one longitudinal end of the cylinder and has an opening 17 through which rod 24 passes. Opening 17 seals against the surface of the rod and prevents actuating fluid from leaking out. End cap 18 encloses the opposing end of the cylindrical potion of the cylinder and prevents actuating fluid from leaking out.

Actuator 10 also includes a piston assembly 20 which includes a piston 22 having an outside diameter 23 configured to seal against the inner diameter 14 of the cylinder and to slide longitudinally, back and forth, with respect to cylinder 12. Piston 22 is coupled to rod 24, which extends from the inside of the cylinder to the outside of the cylinder through opening 17 and is fixed to piston 22 to move simultaneously with the piston. A reflective surface 26 is fixed to piston 22 and is configured to reflect laser light that is introduced into the cylinder. Two ports 28, 30 are provided in the cylinder to introduce an operating fluid into the cylinder or remove the operating fluid from the cylinder. Extension cylinder port 28 is disposed in the cylinder such that fluid introduced into the port will cause the piston and piston rod to move in a direction that increases the overall length of the actuator 10. Retraction cylinder port 30 is disposed in the cylinder such that when a working fluid is introduced into the actuator through this port, it causes the piston assembly to move into the cylinder, or retract, thereby reducing the overall length of actuator 10. When the working fluid is removed from retraction cylinder port 30, rod 24 extends farther outside the cylinder, increasing the overall length of actuator 10.

The cylinder and piston assembly collectively define two internal cavities separated by the piston into which fluid may be introduced or removed. Extension cavity 32, when filled through port 28 causes the piston assembly to extend, increasing the overall length of the actuator. At the same time, retraction cavity 34 is emptied. Similarly, when retraction cavity 34 is filled, through retraction cylinder port 30, retraction cavity 34 fills with fluid, extension cavity 32 empties fluid through extension cylinder port 28.

Excluding the effects due to the size of piston rod 24, actuator 10 has a predetermined internal fluid volume that does not change based upon the position of the piston. This volume (again, discarding the effects due to the size of piston rod 24) is equal to the sum of the volumes of extension cavity 32 and retraction cavity 34.

Actuator 10 also includes a laser diode array 36 which includes one or more laser diodes, each of the laser diodes being configured to generate a laser light beam at a wavelength different from the other laser diodes in the array. These laser diodes are optically coupled to end cap 18 and are disposed with respect to the cylinder such that any of the laser diodes can generate laser beam 44. Cylinder 12 also includes an optical coupler or path 46 that is preferably disposed in one of the end caps (here shown in cap 18) to conduct the laser beam generated by one or more of laser diodes 38 from outside the cylinder to inside the cylinder. Cylinder 12 also includes a second optical coupler or path 48 that is similarly preferably mounted in or on one of the end caps of cylinder 12 (shown here as end cap 18) to conduct the laser beam 44 from a location inside the cylinder to a location outside the cylinder.

Optical couplers 46 and 48 are disposed such that laser beam 44 travels through cylinder 12 in a direction substantially parallel to the longitudinal axis 45 of the cylinder. The light impinges upon reflective surface portion 26, bounces back to reflective surface 51, returns to reflective surface portion 27 on the piston and bounces off that surface to ultimately impinge upon the one or more photo diodes that make up photo diode array 40. The photo diodes, in turn, generate an electrical signal indicative of the light they received from laser beam 44.

Laser beam 44 is made of a series of pulses of light generated by the laser diodes. These pulses, when received by the photo diodes of array 40, cause the photo diodes to generate a similar pulse of electricity. Using actuator 10, one can determine the location of piston 22 within cylinder 12 by determining the time-of-flight of an individual laser pulse. By determining the time difference between when the pulse was created at the laser diodes and the time it was received and converted into an electrical signal by the photo diodes, i.e. the "time of flight", one can calculate the distance traveled by laser beam 44. This distance, as is clear in FIG. 1, is a function of the displacement of piston 22 in cylinder 12.

In the embodiment of FIG. 1, the light pulses generated by the laser diodes are generated in response to electrical signals provided by control unit 39. In addition, the electrical pulses generated by photodiode array 40 are transmitted to control unit 39. The control unit is coupled to laser diode array 36 by cable 37 which is coupled to both the control unit and the laser diode array. In a similar fashion, photo diode array 40 is electrically coupled to control unit 39 by cable 41. It is control unit 39 that determines the time-of-flight through actuator 10 by generating an electrical pulse which it then applies to cable 37 and by receiving a responsive electrical pulse on cable 41. The electrical pulse on cable 41 is generated by photo diode array 40 when it receives a pulse from laser beam 44.

By comparing the time difference between the moment a pulse was applied on cable 37 to the moment a responsive pulse was received on cable 41, control unit 39 can determine the time-of-flight, and hence, the position of piston 22 within cylinder 12. As actuator 10 extends or retracts, piston 22 moves in cylinder 12 and laser beam 44 changes in length. This change in length extends the path of laser beam 44, and thus increases the delay between the time an electrical pulse is generated and applied to cable 37 and the time a responsive pulse is received back at the control unit on cable 41. This time delay is equivalent to the distance traveled by the electrical pulses in cable 37 and 41 in addition to the distance traveled by the light pulses along the path of laser beam 44. Thus, the delay time between the transmission of the pulse and the receipt of a responsive pulse is linearly related to the position of piston 22 and hence the extension of actuator 10.

Details of the structural control unit 39, and several ways of extracting a value indicative of the position of piston 22 within cylinder 12 can be found in U.S. Pat. No. 5,517,198 which is incorporated herein by reference for all that it teaches, including the references cited therein, for all that they teach.

In the preferred embodiment, the laser beam will bounce off both the piston and a fixed surface to define a laser beam path that is substantially equal to four times the length of extension cavity 32. Alternatively, the laser beam need reflect only one time off reflective surface 26 and immediately return to the diodes of diode array 40.

In the arrangement shown in FIG. 1, the laser beam travels in extension cavity 32. The laser diodes, photo diode array, laser beam and reflective surfaces could as easily have been disposed on end cap 16 to travel in retraction cavity 34.

The laser diodes 38 are preferably wave division multiplexed in operation. In addition, to help resolve the time-of-flight for single and multiple reflections, a triangle wave may be used as an analog reference and compared with a reference and delayed pulses.

If the working fluid of the cylinder is air, the attenuation of each pulse in laser beam 44 is insignificant. In this case, a single discrete wavelength is sufficient to get enough reflective intensity to generate a sufficient electrical signal at photo diodes 42. In such cases, a single laser diode and a single photo diode may be sufficient for all operating conditions. However, if the working fluid is a liquid, such as hydraulic oil, it may change its optical properties, such as refractive index, viscosity color and contamination over a period of time. To compensate for these changes in the working fluid, more than one laser diode and/or more than one photo diode may be required in laser diode array 36 and photo diode array 40, respectively.

In order to compensate for these changes in the fluid media, one or more laser diodes transmitting in the optical band from 430 nanometers to 1300 nanometers are preferred. The particular spacing of the frequencies of the laser diodes and the specific frequencies within this range will depend, of course, upon the specific working liquid used. For example, many hydraulic liquids that could be used in actuator 10 vary from golden to reddish to dark brown. In addition, some of these fluids may be contaminated with fluorescent dies from residual contaminates in the hydraulic lines and reservoirs. By providing a plurality of laser diodes operating at two or more frequencies, or by providing a tunable laser diode that is capable of operating at two or more frequencies, these frequencies may be scanned until a specific frequency is found that provides a sufficiently large electrical signal from one or more of the photodiodes in photodiode array 40.

Referring to FIG. 2, a second embodiment of a linear actuator is shown. The difference between the actuator of FIG. 1 and that of FIG. 2 is the location of the photodiode array 40 and the laser diode array 36. In FIG. 1, the two arrays are coupled to the end of actuator 10. Cables 37 and 41 have electrical conductors that electrically couple control unit 39 to the two arrays 36, 40. In the embodiment of FIG. 2, the two arrays 36, 40 are disposed adjacent to the control unit (indeed, they may be in the same housing as the control unit, and cables 37' and 41' include fiber optic channels that conduct laser beam 44 to and from actuator 10. In all other respects the two systems are the same.

FIG. 3 provides additional details of the embodiment of FIG. 2 in the region of end cap 18. In FIG. 2, optical coupler 46 is shown as a hermetically sealed fiber optic feed-through or connector. The free end of coupler 46 includes an adjustable focal length plano-convex lens 50 that is fixed to a screw-on end cap 52. The end cap is in threaded engagement with mating threads 54 on the outside surface of the barrel of optical coupler 46. By threading or un-threading this lens cap, and hence lens 50, the focal length of laser beam 44 can be adjusted to vary the intensity at the photo diode. Similarly, optical coupler 48 includes an adjustable focal length plano-convex lens 56 that is fixed to another screw-on end cap 58 which is threadedly engaged with mating threads 60 on the outer surface of the barrel of coupler 48. Again, by varying the threaded engagement of the end cap with respect to the barrel, lens 56 can be moved toward or away from end cap 18 and the focal length of the laser beam 44 varied. This is done in order to optimize the magnitude of the electric signal coming from photo diode 42. Photo diode 42 is part of the photodiode array 40.

Each optical coupler, 46, 48 extends through end wall 18 and is coupled to a multi-mode fiber optic cable 37', 41', respectively. Couplers 46, 48 hold their respective fiber optic cables in alignment with respect to lens 50, 56, respectively. In this manner, laser beam 44 can travel down input fiber optic cable 37', through coupler 46, bounce off reflective surface 26 (FIG. 1) and return to optical coupler 48, either directly or with an intermediate reflection off end cap 18, thence through output fiber optic cable 41', to photo diodes 42. For convenience in FIG. 2, only a single laser diode and a single photo diode is shown. More than one laser diode or photo diode can be used, as better shown in FIG. 1. At the end of cables 37', 41' disposed away from cylinder 12, are collimators, 66, 68, for collimating laser beam 44. These collimators, here shown in exploded arrangement, preferably include an aspheric plano-convex lens. Input collimator 66 and output collimator 68 are preferably coupled to the end of cables 37' and 41', respectively, using SMA connectors 70, 72, and are held fixed with respect to laser diode 74 (or diode array, see FIG. 1) and photo diode 42. A single laser diode and photo diode are shown in FIG. 3. More than one of each may be used, however. By removing the light emitter (the laser diode) and the light receiver (the photo diode) from the vicinity of the cylinder, the emitter and detector can be spaced closely together and adjacent to circuitry for generating laser beam 44. By locating them closely together, such as is shown in FIG. 3, by placing the laser diodes and photo diode in control unit 39 itself, the system as a whole will be better shielded from electromagnetic interference. This arrangement will also reduce parasitic capacitances and resistances which would make the accurate calculation of the piston position impossible.

The scope of this application is not to be limited by the description above, but is to be limited solely by the scope of the claims which follow.

What is claimed is:

1. A fluid actuated cylindrical actuator, comprising:
a cylinder having first and second ends;
an end cap fixed to the first end of the cylinder and having a rod opening;
a piston disposed in the cylinder;
a rod coupled to the piston and extending from inside the cylinder to outside the cylinder and passing through the rod opening;
a first light guide extending from inside the cylinder to outside the cylinder and adapted to transmit at least a first beam of laser light at a first frequency from outside the cylinder to inside the cylinder and to bar the passage of the fluid;
a second light guide extending from inside the cylinder to outside the cylinder and adapted to transmit the at least a first beam of laser light at said first frequency from inside the cylinder to outside the cylinder and to bar the passage of the fluid; and
wherein the first beam of light is reflected off a first surface inside the cylinder, wherein the first surface is coupled to the rod and configured to move with the rod.

2. The actuator of claim 1, wherein the first light guide is disposed to transmit said first beam of laser light substantially along a longitudinal axis of the cylinder such that the first beam impinges upon a reflective portion of the piston over substantially an entire range of piston travel.

3. The actuator of claim 2, wherein the second light guide is disposed to receive the first beam after it has been reflected off the piston.

4. The actuator of claim 1, wherein an optical distance between the first light guide and the second light guide is a function of the degree of extension of the rod outside of the cylinder.

5. A fluid actuated cylindrical actuator, comprising:
a cylinder having first and second ends;
an end cap fixed to the first end of the cylinder and having a rod opening;
a piston disposed in the cylinder;
a rod coupled to the piston and extending from inside the cylinder to outside the cylinder and passing through the rod opening;
a first light guide extending from inside the cylinder to outside the cylinder and adapted to transmit at least a first beam of laser light at a first frequency from outside the cylinder to inside the cylinder and to bar the passage of the fluid; and
a second light guide extending from inside the cylinder to outside the cylinder and adapted to transmit the at least a first beam of laser light at said first frequency from inside the cylinder to outside the cylinder and to bar the passage of the fluid;
wherein the first light guide is disposed to transmit said first beam of laser light substantially along a longitudinal axis of the cylinder such that the first beam impinges upon a reflective portion of the piston over substantially an entire range of piston travel;
wherein the second light guide is disposed to receive the first beam after it has been reflected off the piston;
wherein an optical distance between the first light guide and the second light guide is a function of the degree of extension of the rod outside of the cylinder; and
wherein the first beam of light is reflected off a first surface portion inside the cylinder, wherein the first surface portion is coupled to the rod and configured to move with the rod.

6. The actuator of claim 5, wherein the first beam of light is reflected off a second surface fixed with respect to the cylinder and moveable with respect to the rod, and a third surface portion fixed with respect to the rod and moveable with respect to the cylinder.

7. The actuator of claim 6, wherein the first beam varies in optical length an amount equal to at least four times an axial distance the rod travels when the rod is moved with respect to the cylinder.

8. A hydraulic actuator for an agricultural or construction vehicle, the actuator comprising:
a) a cylinder having a substantially circular inner circumference and a longitudinal cylindrical axis;
b) a piston having a substantially circular outer circumference configured to be received in and hydraulically sealed against the inner circumference of the cylinder;
c) a piston rod with a substantially circular outer rod circumference, that is fixed to the piston and extends from the piston inside the cylinder, through a first end wall of the cylinder to a location outside the cylinder, wherein the first end wall is disposed to enclose and seal a first end of the cylinder and is substantially perpendicular to the longitudinal axis of the cylinder;
d) a second end wall fixed to the cylinder substantially perpendicular to the longitudinal axis of the cylinder and disposed to seal a second end of the cylinder, the second end wall including a first optical element configured to transmit a beam of laser light through the second end wall to a reflective surface fixed to the piston and further including a second optical element configured to transmit the reflected beam of laser light back through the end wall;
e) a first optical fiber optically and mechanically coupled to the second end wall to transmit the beam of laser light from a remote laser light source to the first optical element; and
f) a second optical fiber optically and mechanically coupled to the second end wall to transmit the reflected beam of laser light to a remote laser light receiver.

9. The hydraulic actuator of claim 8, wherein the first and second optical elements include at least one hermetically sealed fiber optic feed-through or connector extending through the second end wall.

10. The hydraulic actuator of claim 9, wherein the at least one fiber optic feed-through or connector includes an adjustable focal length lens disposed in the beam of laser light and configured to adjust a focal length of the beam of laser light within the cylinder.

11. The hydraulic actuator of claim 10, wherein the at least one fiber optic feed-through or connector includes a thread ed end cap and further wherein the adjustable focal length lens is fixed to the end cap.

12. The hydraulic actuator of claim 9, further comprising another hermetically sealed fiber optic feed-through or connector extending through the second end wall.

13. The hydraulic actuator of claim 12, wherein the first and second optical fibers are multi-modal optical fibers.

14. The hydraulic actuator of claim 13, further comprising a first laser diode configured to emit the beam of laser light at a wavelength in the range of 840 to 980 nanometers.

15. The hydraulic actuator of claim 14, further comprising a first photodiode configured to receive the beam of reflected laser light and generate an electrical signal indicative of at least one characteristic of the beam.

16. The hydraulic actuator of claim 15, further comprising a second laser diode configured to emit the beam of laser light in the range of 430 to 1300 nanometers.

17. The hydraulic actuator of claim 16, further comprising a second photo-diode configured to receive the beam of laser light and generate an electrical signal indicative of at least one characteristic of the beam.

18. A method of determining the position of the piston of the hydraulic actuator of claim 8, comprising the steps of:
   a) generating a beam of laser light;
   b) reflecting the beam of laser light off a surface fixed to move axially with the piston;
   c) receiving the reflected beam of laser light;
   d) calculating a time of flight.

19. The method of claim 18, wherein the step of generating the beam includes the step of generating the beam with a wavelength of between 430 and 1300 nanometers.

20. The method of claim 19, wherein the step of generating the beam includes the step of generating the beam with a wavelength in the range of 840 and 980 nanometers.

21. The method of claim 18, wherein the step of generating the beam includes the step of generating a sequence of individual pulses of light, and wherein the step of calculating a time of flight includes the step of determining the time of flight of at least one pulse in the sequence of individual pulses of light.

wherein the second light guide is disposed to receive the first beam after it has been reflected off the piston;

wherein an optical distance between the first light guide and the second light guide is a function of the degree of extension of the rod outside of the cylinder; and wherein the first beam of light is reflected off a first surface inside the cylinder, wherein the first surface is coupled to the rod and configured to move with the rod.

* * * * *